July 24, 1956  R. V. MEYER  2,755,668
SQUARE LAW RESPONSE DIFFERENTIAL PRESSURE DEVICE
Filed Sept. 28, 1950

*INVENTOR.*
ROBERT V. MEYER
BY Arthur H. Swanson
ATTORNEY.

July 24, 1956  R. V. MEYER  2,755,668
SQUARE LAW RESPONSE DIFFERENTIAL PRESSURE DEVICE
Filed Sept. 28, 1950  2 Sheets-Sheet 2

INVENTOR.
ROBERT V. MEYER
BY Arthur H. Swanson
ATTORNEY.

United States Patent Office 2,755,668
Patented July 24, 1956

2,755,668

SQUARE LAW RESPONSE DIFFERENTIAL PRESSURE DEVICE

Robert V. Meyer, South Lincoln, Mass., assignor to Minneapolis-Honeywell Regulator Company, Minneapolis, Minn., a corporation of Delaware Application September 28, 1950, Serial No. 187,286

4 Claims. (Cl. 73—407)

This invention relates to meters, indicators, recorders and/or controllers which are responsive to a variable which changes as the square of a number. One example is a known type of fluid flow responsive instrument including an orifice through which the fluid flows and which is operative to establish a differential pressure proportional to the square of the velocity of the flowing fluid. A measure of this differential pressure may be utilized to provide an indication of the flow. Because of the square relationship between fluid velocity and differential pressure, however, a linear scale for indicating the flow cannot be used. If it is desired to use a linear scale, suitable means must be provided for extracting the square root of the differential pressure.

It is an object of this invention to provide in apparatus of the above mentioned type improved means for extracting the square root so as to produce a linear scale.

It is a more specific object of this invention to extract the square root by opposing that element of the instrument which is responsive to the differential pressure by the force resulting from a pair of magnets placed with like poles adjacent so that the force between the magnets varies as the square of the distance between them. Since the force exerted between the magnets is proportional to the square of the distance between them, if this force always just balances the differential pressure, which is proportional to the square of the velocity of the fluid to be measured, the resultant movement of the pressure-responsive element will be proportional to the square root of the differential pressure and therefore to the velocity of the fluid. Thus the measurement, indication, record, or control action of the instrument will be linear.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
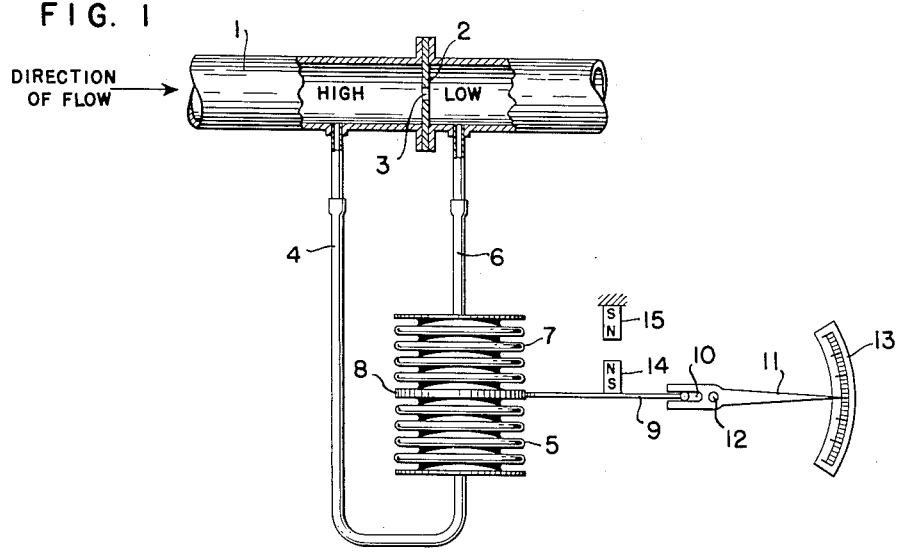
Fig. 1 is a diagrammatic view in side elevation with parts broken away in vertical cross section.

Fig. 1 shows a conduit 1 through which a fluid, either a liquid or a gas, is adapted to flow in the direction of the arrow. This flow is measured by means of a plate 2 containing an orifice 3 which causes the pressure on the down-stream side of the orifice plate to be lower than on the up-stream side. Changes in the velocity of the fluid through this orifice will always produce related and definitely known changes in this pressure difference. This pressure difference varies as the square of the velocity of the flow of the fluid. The high pressure on the up-stream side of orifice 3 is led by a conduit 4 to a bellows 5 while the low pressure on the down-stream side of the orifice 3 is led by a conduit 6 to a bellows 7. Bellows 5 and 7 are separated by a plate 8 on which is carried a rod 9 which rides in a slot 10 in a pointer 11 pivotally mounted on stationary pin 12. The opposite end of pointer 11 cooperates with a scale 13. A magnet 14 is carried by rod 9 and is located with one pole, such as its north (N) pole adjacent the similar or N. pole of a stationary magnet 15. Since these two magnets are located with identical poles adjacent, the force F separating the magnets is:

$$F = \frac{M1 M2}{R^2}$$

M1 and M2 are the pole strengths of the two magnets 14 and 15 and R is the distance separating these magnets. It is obvious that the force tending to separate the magnets bears a square root relationship to the deflection. That is to say, this pair of magnets has a force versus displacement relationship which is a squared function. This is a convenient means to convert a force or pressure into a squared or a square root function. Since this force F is proportional to the square of the distance between the magnets and since this force is used to balance the differential pressure applied to the plate 8, which differential pressure is proportional to the square of the velocity of the fluid to be measured, the resultant force, as measured by the pointer 11, is proportional to the square root of the differential pressure and therefore gives a linear indication of the velocity of flow through the orifice 3.

Figure 2:
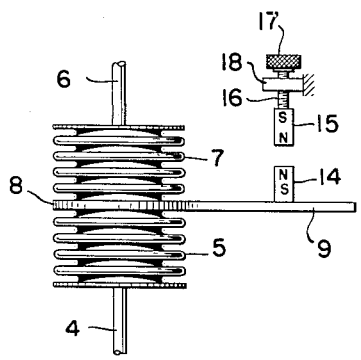
Fig. 2 is a diagrammatic view in side elevation of a portion of the device of Fig. 1 as modified.

Fig. 2 shows a modification in which the magnet 15 is mounted for movement relative to the magnet 14 in order to adjust the force which is exerted between these magnets initially, and also for compensating for decay of the magnetic pole strengths. The decay of magnetic pole strengths is readily compensated for by displacing the magnet 15 to a new position such that the initial distance R between the adjacent poles of the magnets assumes a new value since the change in force versus distance between the magnets is linearly proportional to the distance, and may be mathematically expressed as follows:

$$\frac{dF}{dR} = -2\frac{F}{R}$$

Magnet 15, as shown, is mounted on a screw 16 which has a knurled head or other convenient handle 17. Screw 16 is carried in a stationary plate 18 having a hole through it provided with screw threads interfitting with the threads on screw 16.

Figure 3:
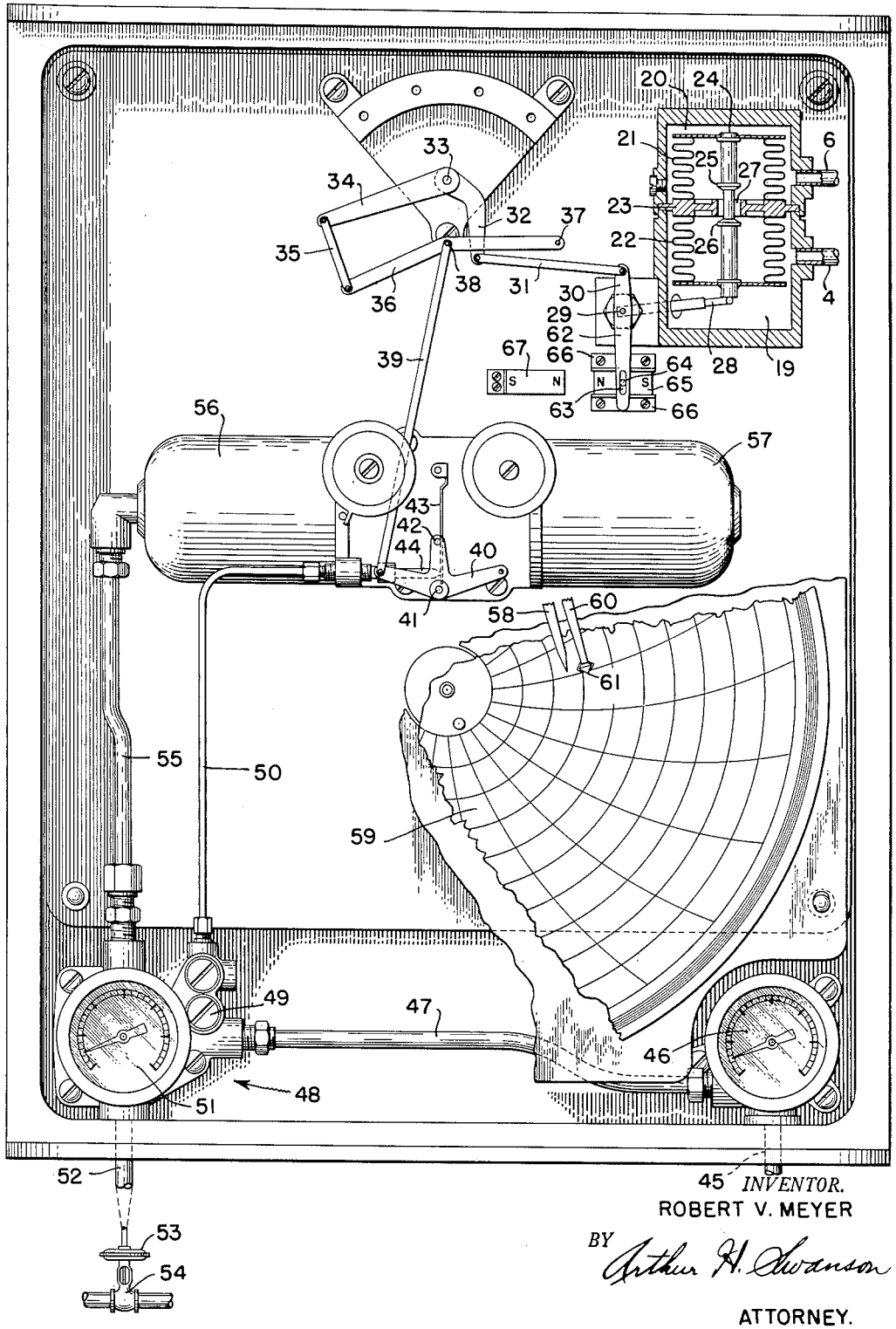
Fig. 3 is a front elevation with parts broken away in vertical cross section of an air-operated flow-responsive controller.

Fig. 3 shows a well known, commercially available, air-operated controller for measuring, indicating, recording, and controlling in response to the flow of a fluid. Such a controller is disclosed in U. S. Patent No. 2,125,081, issued July 26, 1938, to C. B. Moore. The high pressure conduit 4 and the low pressure conduit 6 lead to chambers 19 and 20 which respectively surround bellows 21 and 22 so that the high and low pressures are applied to the outer sides of these bellows. The adjacent ends of bellows 21 and 22 are secured to a stationary plate 23. The free ends of these bellows are connected by a rod 24 which has a pair of valves 26 and 25 on it. Valves 25 and 26 cooperate with a pair of valve seats which form the opposite ends of a conduit 27 which connects the interiors of the bellows 21 and 22. Bellows 21 and 22 may be filled with an incompressible liquid such as oil. If an excess pressure is applied to the outer side of either bellows, the valve 25 and 26 will close against its adjacent valve seat thus trapping incompressible liquid inside of that bellows to which the excess pressure is applied. This trapped liquid prevents rupture of the bellows which is exposed to an excessive pressure.

The lower end of rod 24 bears on an arm 28 which forms one of the three arms of a lever pivoted at a pressure-tight bearing 29. Arm 30 of this lever connects by link 31 with arm 32 of a lever pivoted at 33 and having a second arm 34 which has a link 35 pivotally mounted thereon. The opposite end of link 35 is pivotally connected to lever 36, whose opposite end 37 is manually adjustable to provide the set point or that value of the variable to which the controller is responsive from which any departures of the measured variable cause the controller to operate.

Pivotally connected to an intermediate point 38 of lever 36 is a link 39 which is pivoted at its opposite end to a three-arm lever 40 pivotally mounted on an adjustable pin 41 and carrying a pin 42 which actuates a flapper or like valve 43 cooperating with a stationary nozzle 44.

Air or other fluid for operating the controller enters through conduit 45 at the lower right hand corner and passes through a gauge 46, which indicates the supply pressure, and a conduit 47 to a pilot valve or relay generally indicated at 48. This pilot valve or relay contains an operating motor (not shown) such as a diaphragm or bellows to which the supply air is fed through a restriction 49 which causes a drop in the pressure of the fluid. This motor-operating fluid at this reduced pressure is led through conduit 50 to nozzle 44 so that the pressure applied to the motor is varied according to the position of flapper 43. This motor operates an inlet valve or an exhaust valve so as to supply fluid to or exhaust fluid from a controlled fluid chamber in the relay 48. This controlled pressure is indicated by means of gauge 51 and is fed through conduit 52 to the final control element such as the diaphragm-operated motor 53 controlling a valve 54.

This controlled air is also fed through conduit 55 to a follow-up chamber 56 which contains a follow-up motor (not shown) such as a bellows or diaphragm having a connection with pin 42 so as to move the flapper in the opposite direction to that in which it was moved in response to the differential pressure applied to the bellows 21 and 22. The follow-up motor in the follow-up chamber 56 also has an operating connection with a reset motor (not shown) located in the reset chamber 57. The connection between the follow-up motor and the reset motor has a restriction or other delay device so that the reset motor does not operate immediately upon operation of the follow-up motor. The reset motor has operative connections with the pin 42 so that the reset moves the pin 42 in the same direction as the original differential pressure applied to bellows 21 and 22. Thus the reset motor tends to eliminate, but never completely, the movement due to the follow-up motor. The manually operable set-point adjustment 37 causes the set-point indicator 58 to move over a chart 59 to indicate that value of the controlled variable, in this case fluid flow, to which the controller is set. Lever 32—34 has connected to it a pen arm 60 which carries a pen 61 over the chart 59 so as to record thereon the instantaneous values of the flow.

The novel features of this invention applied to the above described controller comprise the lever arm 62 mounted on the pressure-tight bearing 29 and having a slot 63 adjacent its free end. In slot 63 rides a pin 64 fastened on magnet 65 which is slidable in stationary guides 66. One pole of magnet 65, the end pole for example, is located adjacent the identical end pole of a stationary magnet 67. The force of repulsion between these magnets therefore varies as the square of the distance between them according to the formula above. Since the differential pressure applied to the bellows 21 and 22 varies as the square of the flow of the fluid which is measured by an orifice plate produces differential pressure, the resultant rotation given to the lever having the three arms 28, 30, and 62 varies directly with the flow in a linear fashion.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. Apparatus for producing an output which varies linearly with linear variations of a variable and where the immediate measure of the magnitude of the variable is in accordance with a force which is a squared function of said variable, comprising, a member movable in a straight line, mechanical means arranged to apply to said member a force which varies as the square with linear changes in the magnitude of the variable so as to move said member in a straight line, a first permanent elongated bar magnet having a single N pole and a single S pole and directly mounted on and movable in a straight line in response to movements of said member, the arrangement being such that the extent of movement of said magnet in response to force applied by said mechanical means can be varied proportionately with the difference between the last said force and a force exerted on said magnet in opposition to said last said force, a second permanent elongated bar magnet having a single N pole and a single S pole and equal in size to said first magnet and mounted in a fixed position adjacent to said first magnet so that the magnetic field of said second magnet will act in opposition to the magnetic field of said first magnet with a force which is a squared function of the relative position of said magnets, said magnets having all the poles located in a single straight line and when so acting constraining the movement of said member to linear motion.

2. In a differential-pressure-responsive device, a resilient element movable in response to a differential pressure, a lever pivotally supported adjacent said element so as to be moved by the movement thereof, a first permanent elongated bar magnet connected to said lever so as to be moved thereby and having a single N pole and a single S pole, means constraining said magnet for movement along a fixed straight-line path, a second permanent elongated bar magnet fixedly mounted adjacent said first magnet and having a single N pole and a single S pole, said magnets having all the poles located in a single straight line and having one pair of like poles closely spaced apart a lesser distance than the unlike poles, each of said pair of closely spaced like poles being within the magnetic field of the other and positioned so that movement of the first of said magnets along said fixed path changes the distance between the said like poles, whereby the repulsive force between the magnets varies as the square of the distance between said magnets, and an output link connected to said lever so as to be driven thereby.

3. In a measuring apparatus having a linear output, a member moved yieldingly according to the square of a variable, a permanent elongated bar magnet having a single N pole and a single S pole and connected to and moved in a straight line by movements of said member, means constraining said permanent magnet for movement in a straight line, and a permanent elongated bar magnet having a single N pole and a single S pole and fixedly mounted adjacent said movable magnet, all the poles of said permanent magnets being in a single straight line, one pair of identical poles of said permanent magnets being spaced apart a less distance than the different poles of said permanent magnets, said identical poles each being within the magnetic field of the other throughout the range of movement of said movable magnet, whereby the repulsive force between said magnets varies as the square of the movement between said magnets and thereby extracts the square root of the movement of said member.

4. A flow meter having a linear output and including, a closed casing, a flexible member mounted in said casing and dividing it into separate chambers, means for applying a different pressure to each chamber and therefore to each side of said flexible member, a lever engaging said flexible member and rocked thereby and pivotally mounted on and projecting through a pressure tight seal in the wall of said casing, a first permanent elongated bar magnet having a single N pole and a single S pole and connected to said lever so as to be moved by movements of said flexible member and of said lever, a second permanent elongated bar magnet having a single N pole and a single S pole and fixedly mounted within the magnetic field of at least one pole of said first magnet, one pair of like poles of said magnets being closer than the unlike poles, stationary guides causing said first magnet to move relative to said second magnet in a straight line defined by all the poles of said magnets, and an output linkage connected to said lever on the output side of said seal and movable by linear increments because the repulsive force between said magnets and the difference between the pressures applied to said flexible member both vary as the square and therefore cancel.

References Cited in the file of this patent

UNITED STATES PATENTS

| | | |
|---|---|---|
| 1,841,543 | McKeown | Jan. 19, 1932 |
| 1,993,527 | Mears et al. | Mar. 5, 1935 |
| 2,148,523 | Baermann | Feb. 28, 1939 |
| 2,199,013 | Sprague et al. | Apr. 30, 1940 |
| 2,223,712 | Ziebolz | Dec. 3, 1940 |
| 2,279,076 | Sutton | Apr. 7, 1942 |
| 2,365,573 | McGay | Dec. 19, 1944 |
| 2,399,938 | Pett | May 7, 1946 |
| 2,454,038 | Crever | Nov. 16, 1948 |
| 2,491,998 | Mikina | Dec. 20, 1949 |

FOREIGN PATENTS

| | | |
|---|---|---|
| 534,155 | Germany | Sept. 23, 1931 |
| 692,593 | Germany | June 22, 1940 |
| 592,171 | Great Britain | Sept. 10, 1947 |